United States Patent
Lovmand

(10) Patent No.: US 12,006,915 B2
(45) Date of Patent: Jun. 11, 2024

(54) METHOD FOR IMPROVING REPORTING OF OPERATIONAL DATA OF A WIND TURBINE

(71) Applicant: SCADA INTERNATIONAL A/S, Silkeborg (DK)

(72) Inventor: Bo Lovmand, Hadsten (DK)

(73) Assignee: SCADA INTERNATIONAL A/S, Silkeborg (DK)

( * ) Notice: Subject to any disclaimer, the term of this patent is extended or adjusted under 35 U.S.C. 154(b) by 0 days.

(21) Appl. No.: 18/479,413

(22) Filed: Oct. 2, 2023

(65) Prior Publication Data

US 2024/0026858 A1    Jan. 25, 2024

Related U.S. Application Data

(63) Continuation of application No. 17/012,584, filed on Sep. 4, 2020, now abandoned, which is a continuation of application No. PCT/DK2019/050280, filed on Sep. 23, 2019.

(30) Foreign Application Priority Data

Sep. 25, 2018   (DK) .......................... PA 2018 00634

(51) Int. Cl.
| | |
|---|---|
| *F03D 7/02* | (2006.01) |
| *F03D 7/04* | (2006.01) |
| *F03D 9/25* | (2016.01) |
| *F03D 17/00* | (2016.01) |

(Continued)

(52) U.S. Cl.
CPC ........... *F03D 7/0264* (2013.01); *F03D 7/042* (2013.01); *F03D 9/255* (2017.02); *F03D 17/00* (2016.05); *F03D 80/70* (2016.05); *G05B 23/02* (2013.01); *G06F 11/30* (2013.01); *F05B 2260/80* (2013.01); *F05B 2260/98* (2013.01);

(Continued)

(58) Field of Classification Search
CPC ........ F03D 7/0264; F03D 7/042; F03D 9/255; F03D 17/00; F03D 80/70; F03D 9/257; F03D 7/00; G05B 23/02; G06F 11/30; F05B 2260/80; F05B 2260/98; F05B 2270/107; F05B 2270/303; F05B 2270/32;

(Continued)

(56) References Cited

U.S. PATENT DOCUMENTS

| | | | |
|---|---|---|---|
| 6,925,385 B2 * | 8/2005 | Ghosh ..................... | F03D 7/043 702/14 |
| 7,013,203 B2 * | 3/2006 | Moore ..................... | F03D 7/047 700/286 |

(Continued)

FOREIGN PATENT DOCUMENTS

| | | |
|---|---|---|
| EP | 1808768 A2 | 7/2007 |
| EP | 2172824 A1 | 4/2010 |
| EP | 3252556 A2 | 12/2017 |

OTHER PUBLICATIONS

International Search Report for PCT Patent App. No. PCT/DK2019/050280 (Nov. 27, 2019).

*Primary Examiner* — Ramesh B Patel
(74) *Attorney, Agent, or Firm* — Cermak & McGowan LLP; Malcolm K. McGowan

(57) ABSTRACT

The invention described herein relates to a process for improving reporting of operational data of a wind turbine during operation thereof and a system for carrying out the process which may include a computer program for carrying out the process.

12 Claims, 2 Drawing Sheets

(51) Int. Cl.
   *F03D 80/70* (2016.01)
   *G05B 23/02* (2006.01)
   *G06F 11/30* (2006.01)
(52) U.S. Cl.
   CPC ... *F05B 2270/107* (2013.01); *F05B 2270/303* (2013.01); *F05B 2270/32* (2013.01); *F05B 2270/325* (2013.01); *F05B 2270/329* (2013.01); *F05B 2270/337* (2013.01)
(58) Field of Classification Search
   CPC .......... F05B 2270/325; F05B 2270/329; F05B 2270/337; Y02E 10/72
   See application file for complete search history.

(56) References Cited

U.S. PATENT DOCUMENTS

| | | | |
|---|---|---|---|
| 7,099,800 B2* | 8/2006 | Henriksen | F03D 7/047 700/286 |
| 9,062,653 B2* | 6/2015 | Brath | F03D 17/00 |
| 9,957,951 B2* | 5/2018 | Christensen | F03D 7/043 |
| 10,697,438 B2* | 6/2020 | Lundsgaard | G01M 5/0066 |
| 11,015,577 B2* | 5/2021 | Son | G06Q 10/087 |
| 11,209,813 B2* | 12/2021 | Cella | H04L 67/1097 |
| 11,549,491 B2* | 1/2023 | Damgaard | F03D 7/04 |
| 11,742,669 B2* | 8/2023 | Damgaard | H02J 7/00714 290/55 |
| 2004/0230377 A1* | 11/2004 | Ghosh | F03D 7/048 702/3 |
| 2005/0090937 A1* | 4/2005 | Moore | F03D 17/00 700/286 |
| 2010/0280673 A1 | 11/2010 | Woste | |
| 2015/0115609 A1 | 4/2015 | Bohlen et al. | |
| 2017/0350370 A1* | 12/2017 | Son | F03D 80/50 |
| 2017/0352245 A1* | 12/2017 | Maher | G08B 21/182 |
| 2017/0356424 A1* | 12/2017 | Lundsgaard | G01B 5/14 |
| 2019/0041843 A1* | 2/2019 | Cella | G05B 23/0289 |
| 2020/0141392 A1* | 5/2020 | Damgaard | F03D 17/00 |
| 2021/0062786 A1* | 3/2021 | Lovmand | F03D 9/257 |

* cited by examiner

METHOD FOR IMPROVING REPORTING OF OPERATIONAL DATA OF A WIND TURBINE

This application is a continuation of U.S. application Ser. No. 17/012,584, filed 4 Sep. 2020, now abandoned, which claims priority from PCT/DK2019/050280, filed 23 Sep. 2019, which claims priority from Danish patent application PA 2018 00634, filed 25 Sep. 2018. The contents of these priority applications are incorporated herein by reference in their entirety.

FIELD OF THE INVENTION

The present invention relates in general to the field of wind turbines. More specifically the present invention relates in a first aspect to a method for improving the reporting of operational data of a wind turbine during operation thereof.

In a second aspect the present invention relates to a computer program product, which when loaded and/or operating on a computer, being configured for performing a method according to the first aspect of the present invention.

In a third aspect the present invention relates to a SCADA system (Supervisory Control And Data Acquisition System) comprising a computer program product as defined in respect of the second aspect of the present invention.

In a fourth aspect the present invention relates to use of a correlation of information to verify whether the logged settings and/or resetting of an alarm is reliable.

In a fifth aspect the present invention relates to use of a correlation of information for calculating the amount of time and/or at which specific periods of time, in respect of which a specific sector of a wind turbine has been operating properly and/or improperly.

BACKGROUND OF THE INVENTION

Within the field of wind turbines and the operation thereof it is customary that the manufacturer which has manufactured the wind turbine is different from the company responsible for operating the wind turbine or wind farm.

In order to secure or guarantee the operator's viable economy in respect of operating a wind turbine or a wind farm it is customary that a contract is agreed between the manufacturer of the wind turbine or parts thereof one the one hand and the operator of the wind turbine or wind farm, on the other hand.

In such a contract it is stipulated which types of faults, errors and special conditions leading to missing or reduced power production is the responsibility of the producer and which types of faults, errors and special conditions leading to missing or reduced power production is the responsibility of the operator.

Typically, such a contract will also contain detailed calculation schedule dividing the value represented by the power produced by a wind turbine between the manufacturer and the operator according to predetermined allocations. Hereby the manufacturer will have an incentive to continuously improve the quality of the components making up the wind turbine in order to reduce the downtime of the wind turbine. This will eventually secure an optimum energy production.

However, even in a situation in which no such contract exists or in a situation in which the term of such a contract has expired, it is of high interest for the operator of the wind turbine to continuously gain information relating to the operational state of the wind turbine, including information relating the duration of and in which specific periods of time the wind turbine has been operating properly or not properly.

A wind turbine is operated by the use of a control system which monitors a vast number of sensor parameters associated with the operation of the wind turbine and senses by a number of sensors. Each sensor is responsible for sensing a specific parameter or group of parameters.

The control system is configured to use the parameters monitored as inputs in the calculation of a feedback procedure. In this way a wind turbine can be operated automatically according to a predetermined algorithm using monitored parameters to create a feedback response which in turn is used for controlling the wind turbine.

In addition to monitoring a wind turbine in relation to operational parameters, the control system of a wind turbine is moreover configured to register an alarm situation in case a sensed parameter value, or a combination of two or more sensed parameter values, represents a critical event, i.e. a situation in which it is desired to shut down the wind turbine according to one or more predetermined criteria.

Accordingly, in case a control system of a wind turbine registers, from the information transmitted by the sensors, a critical event, the control system instructs the wind turbine to shut down the wind turbine.

Each a sensed parameter value, or a combination of two or more sensed parameter values, representing a critical event is given a specific alarm ID.

Furthermore, the various alarm IDs are in the control system grouped into sectors, wherein each sector is related to alarm IDs associated with alarms belonging to a specific part of the wind turbine or its installation or operation.

It is also customary that a control system of a wind turbine comprises a time counter, counting the amount of time at which no alarm IDs belonging to a specific sector is set.

Typically, a control unit of a wind turbine is coupled to a monitoring system which receives and stores, on a data storage, data relating to the operation of the wind turbine.

The operational data may specifically comprise information relating to the setting and resetting of various alarm IDs being sent from the control unit and also the time stamps indicating the point in time of such settings and resettings of alarm IDs.

Accordingly, the operational data may represent valuable information in the process of determining the amount of time in which the wind turbine, or specific parts thereof, have been operating properly or improperly.

As already indicated such information is used when dividing the value represented by the power produced by a wind turbine between the manufacturer and the operator according to a predetermined allocation schedule.

Now, it may happen that the data received and/or registered by the monitoring system from the control system and relating to the setting and resetting of various alarm IDs and their associated time stamps, indicating the point in time of such settings and resettings of alarms, are not representing an accurate picture of the operational state of the wind turbine.

One reason for such an inaccurate picture of the operational state of the wind turbine may be due to a transmission error between the control unit (receiving the parameters measured by the sensors) and the operational monitoring system storing the associated data.

It is clear that an incorrect picture of an operational state of a wind turbine, as determined by the monitoring system will lead to an allocation of the value represented by the power produced by a wind turbine between the manufacturer and the operator in a way which deviates from the true situation and thereby also does not comply with the original intention as stipulated by the contract agreed between the operator and the manufacturer of the wind turbine.

Accordingly, a need persists to improve reporting of operational data of a wind turbine during operation thereof The present invention in its various aspect seeks to solve these problems.

Accordingly, it is an objective of the present invention to provide methods, uses and devices which solves the problems relating to monitoring and logging data associated with the operational state of a wind turbine during operation thereof.

BRIEF DESCRIPTION OF THE INVENTION

These objectives are fulfilled according to the first, the second, the third, the fourth and the fifth aspect of the present invention.

In a first aspect the present invention relates to a method for improving reporting of operational data of a wind turbine during operation thereof; said method comprising the steps of:

allowing an array of sensors to sense one or more specific parameter values of said wind turbine during operation thereof;

in respect of one or more sensors, transmitting said parameter value being sensed to a control system;

allowing said control system to register a critical event in case a sensed parameter value, or a combination of two or more sensed parameter values, represents a situation in which it is desired to shut down the wind turbine according to one or more predetermined criteria;

allowing said control system to set a specific alarm at a point in time at which a specific critical event is registered; and allowing said control system to reset said specific alarm at a point in time at which the registration of the presence of said critical event ceases; wherein each specific alarm is associated with a corresponding alarm ID;

wherein said alarms IDs are grouped into different sectors; each sector belongs to a specific part of the wind turbine or its installation or operation;

wherein information from said control system relating to settings and resetting of one or more alarms corresponding to an individual alarm ID is being transmitted to a monitoring system which is configured for logging and storing such information;

wherein said method furthermore comprises the steps of:

i) in respect of one or more alarm IDs, allowing said monitoring system to register a time stamp in respect of each setting of said alarm ID and to register a time stamp in respect of each resetting of said alarm ID;

ii) in respect of a specific sector, allowing said control system to count the amount of time at which no alarm IDs belonging to that specific sector is set, and to transfer information relating to such counting to said monitoring system;

iii) in case the monitoring system detects that counting in step ii) has stopped in respect of a time range at which no alarms belonging to that specific sector is logged as being set, allow the monitoring system to register that the wind turbine in respect of said specific sector is not operating properly in a period of time corresponding to that range in time.

In a second aspect the present invention relates to a computer program product, which when loaded and/or operating on a computer, being configured for performing a method according to the first aspect of the present invention.

In a third aspect the present invention relates to a SCADA system (Supervisory Control And Data Acquisition System) comprising a computer program product as defined in respect of the second aspect of the present invention.

In a fourth aspect the present invention relates to a use of a correlation between information representing a time counting in respect of which no alarms in a specific sectors of alarms belonging to that specific sector is set, as registered by a control system, on the one hand; and information relating to setting of one or more alarms as logged in a monitoring system on the other hand to verify whether the logged settings and/or resetting of an alarm is reliable.

In a fifth aspect the present invention relates to a use of a correlation between information representing a time counting in respect of which no alarms in a specific sectors of alarms belonging to that specific sector is set, as registered by a control system, on the one hand; and information relating to setting of one or more alarms as logged in a monitoring system on the other hand for calculating the amount of time and/or at which specific periods of time, in respect of which a specific sector of said wind turbine has been operating properly and/or improperly.

The present invention in its various aspects provides for improving reporting of operational data of a wind turbine during operation thereof.

DETAILED DESCRIPTION OF THE INVENTION

Figure 1:
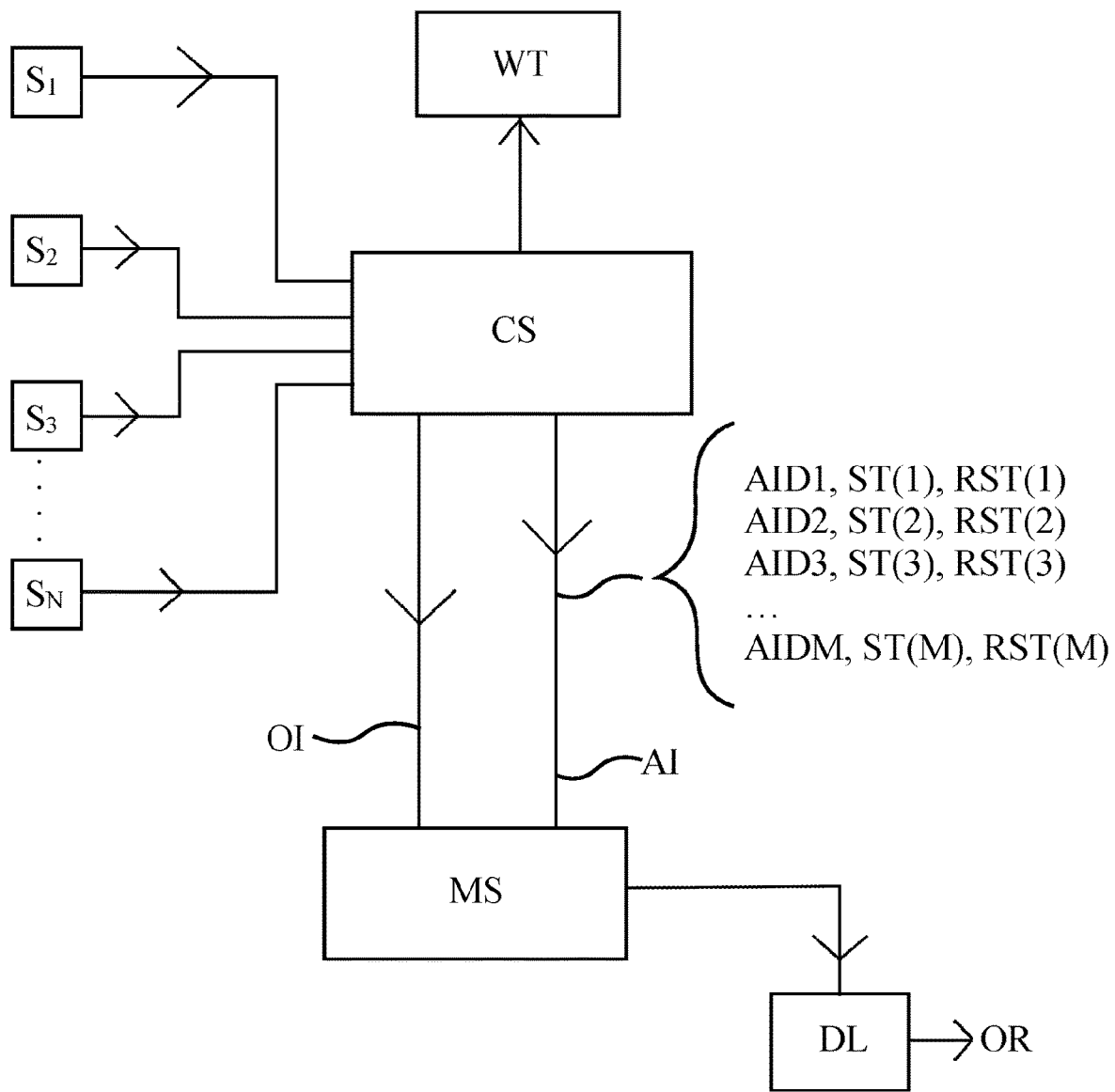
FIG. 1 schematically illustrates some of the components of a wind turbine employed in the present invention.

The First Aspect of the Present Invention

In a first aspect the present invention relates to a method for improving reporting of operational data of a wind turbine during operation thereof; said method comprising the steps of:

allowing an array of sensors to sense one or more specific parameter values of said wind turbine during operation thereof;

in respect of one or more sensors, transmitting said parameter value being sensed to a control system;

allowing said control system to register a critical event in case a sensed parameter value, or a combination of two or more sensed parameter values, represents a situation in which it is desired to shut down the wind turbine according to one or more predetermined criteria;

allowing said control system to set a specific alarm at a point in time at which a specific critical event is registered; and allowing said control system to reset said specific alarm at a point in time at which the registration of the presence of said critical event ceases; wherein each specific alarm is associated with a corresponding alarm ID;

wherein said alarms IDs are grouped into different sectors; each sector belongs to a specific part of the wind turbine or its installation or operation;

wherein information from said control system relating to settings and resetting of one or more alarms corresponding to an individual alarm ID is being transmitted to a monitoring system which is configured for logging and storing such information;

wherein said method furthermore comprises the steps of:

i) in respect of one or more alarm IDs, allowing said monitoring system to register a time stamp in respect of each setting of said alarm ID and to register a time stamp in respect of each resetting of said alarm ID;

ii) in respect of a specific sector, allowing said control system to count the amount of time at which no alarm IDs belonging to that specific sector is set, and to transfer information relating to such counting to said monitoring system;

iii) in case the monitoring system detects that counting in step ii) has stopped in respect of a time range at which no alarms belonging to that specific sector is logged as being set, allow the monitoring system to register that the wind turbine in respect of said specific sector is not operating properly in a period of time corresponding to that range in time.

In the following description and in the appended claims the following definitions may be adhered to:

Alarm value: An alarm value is a value being provided by the control system of the wind turbine. An alarm value can have one of two values; either the alarm value is "set" or "reset".

Setting of an alarm: A "set" value indicates that a critical event has been detected, which results in the wind turbine is being shut down by the control system.

Resetting of an alarm: A "reset" value in respect of a specific alarm indicates a situation in which the critical value, setting the alarm in the first place, is no longer present.

Time stamp: A time stamp in respect of the setting or resetting of an alarm shall be construed to mean the point in time at which the alarm is being set or reset, as the case may be.

In the description and in the appended claims the definition of the invention of the first aspect includes the term "allowing" followed by an action which is allowed to be performed. In this respect it should be noted that the action following the term "allowing" is not to be construed as an optional feature which may or may not be included. Rather, the term "allowing" as used in the definitions of the present invention should be construed in such a way that, in the invention, the action following the term "allowing" indeed is carried out (obviously taking into account any stated or implied conditional prerequisite).

In one embodiment of the method according to the first aspect of the present invention the number of sensors in said array of sensors and/or the number of alarm IDs of said wind turbine independently is selected from the ranges of 5-2000 or more, such as 10-1000, for example, 25-900, such as 50-800, for example 100-800, e.g. 200-700, such as 300-600 or 400-500.

Such numbers of sensors are common in modern wind turbines.

In one embodiment of the method according to the first aspect of the present invention one or more of said one or more sensors relate to sensors for sensing:

problems with the mechanics; such as undesirably low level of gear oil, undesirably high bearing temperature, stuck pitch actuator, undesirably high yaw misalignment; and/or problems with the grid, such as undesirably low grid frequency, undesirably high grid voltage, phase asymmetry; and/or problems with the environment, such as undesirably high wind speed, undesirably low ambient temperature, undesirably low wind speed; and/or external commands, such as remote stop instructions; and/or normal operation, such as untwisting cables, performing self-test, heating component; and/or wind turbine has been stopped by power trader and/or wind turbine has been stopped by utility authority or by grid authority.

These types of problems typically could trigger one or more alarm IDs.

In one embodiment of the method according to the first aspect of the present invention the one or more sectors belongs to one or more of the following: data relating to the operation of the turbine; data relating to the environment of the wind turbine; data relating to the grid to which the wind turbine supplies power; data relating to "remotely stopped"; data relating to "stopped for service"; data relating to "stopped by trader".

Time counters in respect of these sectors may provide important information useful in the method of the first aspect of the present invention.

In one embodiment of the method according to the first aspect of the present invention and in respect of a specific sectors, the time counting performed in step ii) by said control system comprises registering at time stamps, separated by a predetermined period of time, a counting of the accumulated time at which no alarm IDs belonging to that specific sector is set.

Hereby one can keep accurate track of the points in time in respect of which an alarm having a specific alarm ID is being set or reset.

In one embodiment of the method according to the first aspect of the present invention the predetermined period of time, separating time stamps are selected from the ranges 0.1 s-600 min, such as 0.5 s-550 min., e.g. 1 s-500 min., such as 5 s-450 min., e.g. 10 s-400 min., such as 15 s-350 min., such as 30 s-300 min., for example 45 s-250 min., e.g. 1 min-200 min, such as 5 min.-150 min., for example 10 min.-100 min., such as 15 min.-45 min.

These durations of time between time stamps are suitable for being employed in the method according to the first aspect of the present invention.

In one embodiment of the method according to the first aspect of the present invention the method is being performed automatically.

In one embodiment of the method according to the first aspect of the present invention the method is being performed continuously or regularly in respect of successive time spans.

These two embodiments in a conveniently way ensures continuous improving reporting of operational data of a wind turbine during operation thereof.

In one embodiment of the method according to the first aspect of the present invention the method involves keeping a data log, logging a data set originating from said monitoring system and relating to one or more of the following entries: alarm IDs in respect of which an alarm has been set and/or reset, including the corresponding time stamp; information relating to the amount of time at which no alarm IDs belonging to that specific sector is set in respect of a specific sector, as determined in step ii); the registration as performed in step iii).

Keeping a data log ensures the ability to inspect data which has been logged at a point in time subsequent to the time of logging.

The Second Aspect of the Present Invention

In a second aspect the present invention relates to a computer program product, which when loaded and/or operating on a computer, being configured for performing a method according to the first aspect of the present invention.

The Third Aspect of the Present Invention

In a third aspect the present invention relates to a SCADA system (Supervisory Control And Data Acquisition System) comprising a computer program product as defined in respect of the second aspect of the present invention.

The Fourth Aspect of the Present Invention

In a fourth aspect the present invention relates to a use, in relation to a wind turbine, of a correlation between information representing a time counting in respect of which no alarms in a specific sectors of alarms belonging to that specific sector is set, as registered by a control system, on the one hand; and information relating to setting of one or more alarms as logged in a monitoring system on the other hand to verify whether the logged settings and/or resetting of an alarm is reliable.

The Fifth Aspect of the Present Invention

In a fifth aspect the present invention relates to a use, in relation to a wind turbine, of a correlation between information representing a time counting in respect of which no alarms in a specific sectors of alarms belonging to that specific sector is set, as registered by a control system, on the one hand; and information relating to setting of one or more alarms as logged in a monitoring system on the other hand for calculating the amount of time and/or at which specific periods of time, in respect of which a specific sector of said wind turbine has been operating properly and/or improperly.

Referring to the figures in order to better illustrating the present invention, FIG. 1 is a schematic diagram which in a very simplified manner illustrates the operation of a wind turbine FIG. 1 shows the wind turbine WT which is being controlled by a control system CS according to a predetermined control algorithm. A number of sensors $S_1$, $S_2$, $S_3$ ... $S_N$ sense various parameter values during the operation of the wind turbine. These parameter values are being transmitted to the control system CS.

Accordingly, the parameter values being transmitted to the control system is used as input in the algorithm determining a proper feedback reaction in respect of operating the wind turbine.

Various operation data is being sent to a monitoring system MS during operation of the wind turbine.

In addition to merely receiving parameter values from the sensors $S_1$, $S_2$, $S_3$ ... $S_N$ and providing feedback in the operation of the wind turbine, the control system CS is also configured, from the parameter values received from the sensors $S_1$, $S_2$, $S_3$ ... $S_N$, to determine whether or not a critical event has been encountered which could jeopardize the short time and/or long time integrity of the wind turbine or components thereof. The determination of whether or not a critical event has occurred is being provided according to a predetermined criteria.

In case the control system detects that a critical event is present, the control unit instruct the wind turbine WT to shut down.

Various values of the parameters transmitted from the sensors $S_1$, $S_2$, $S_3$ ... $S_N$, or combination of such values may represent a critical event which result in the wind turbine being shut down. A critical event triggers the provision of an alarm value with an associated alarm ID, where the alarm ID identifies which reason is responsible for the setting of an alarm. The alarm value in respect of a given alarm ID X may be either setting of alarm ID X or resetting of alarm ID X.

Accordingly, besides of providing the monitoring system MS with operational information OI, also alarm information AI is provided to the monitoring system MS. Such alarm information may in respect of a given alarm ID X relate to the identity of alarm ID X in question, i.e. A ID X, and the time stamp associated with the setting time of alarm ID X, i.e. ST(X), and the time stamp associated with the resetting time of alarm ID X, i.e. RST(X).

The operational information OI and the alarm information AI received by the monitoring system MS may be logged in a data log DL. From the data log DL may be retrieved an operational report OR, setting out details relating to the operation of the wind turbine, especially the duration of time periods at which the wind turbine WT or specific components thereof are operating properly or not properly.

The operational report OR is used in the calculation of the sharing of the value represented by the power produced by the wind turbine between the operator of the wind turbine on the one hand and the manufacturer of the wind turbine, or parts thereof on the other hand.

In a situation in which, for whatever reason, the monitoring system MS does not receive correct information relating to a critical event from the control system CS, it is clear that the data log DL, from which the operational report OR is retrieved, will not reflect the true operational conditions of the wind turbine WT.

Thereby, also the calculation of the value represented by the power produced by the wind turbine, and the allocation thereof, between the operator of the wind turbine on the one hand manufacturer of the wind turbine, or parts thereof on the other hand, will not be performed in accordance with the original intentions agreed upon.

Typical reasons that the monitoring system MS does not receive correct information from the control system CS may relate to missing information relating to settings and resettings of a specific alarm ID representing a critical event being detected by the control system CS.

Figure 2:
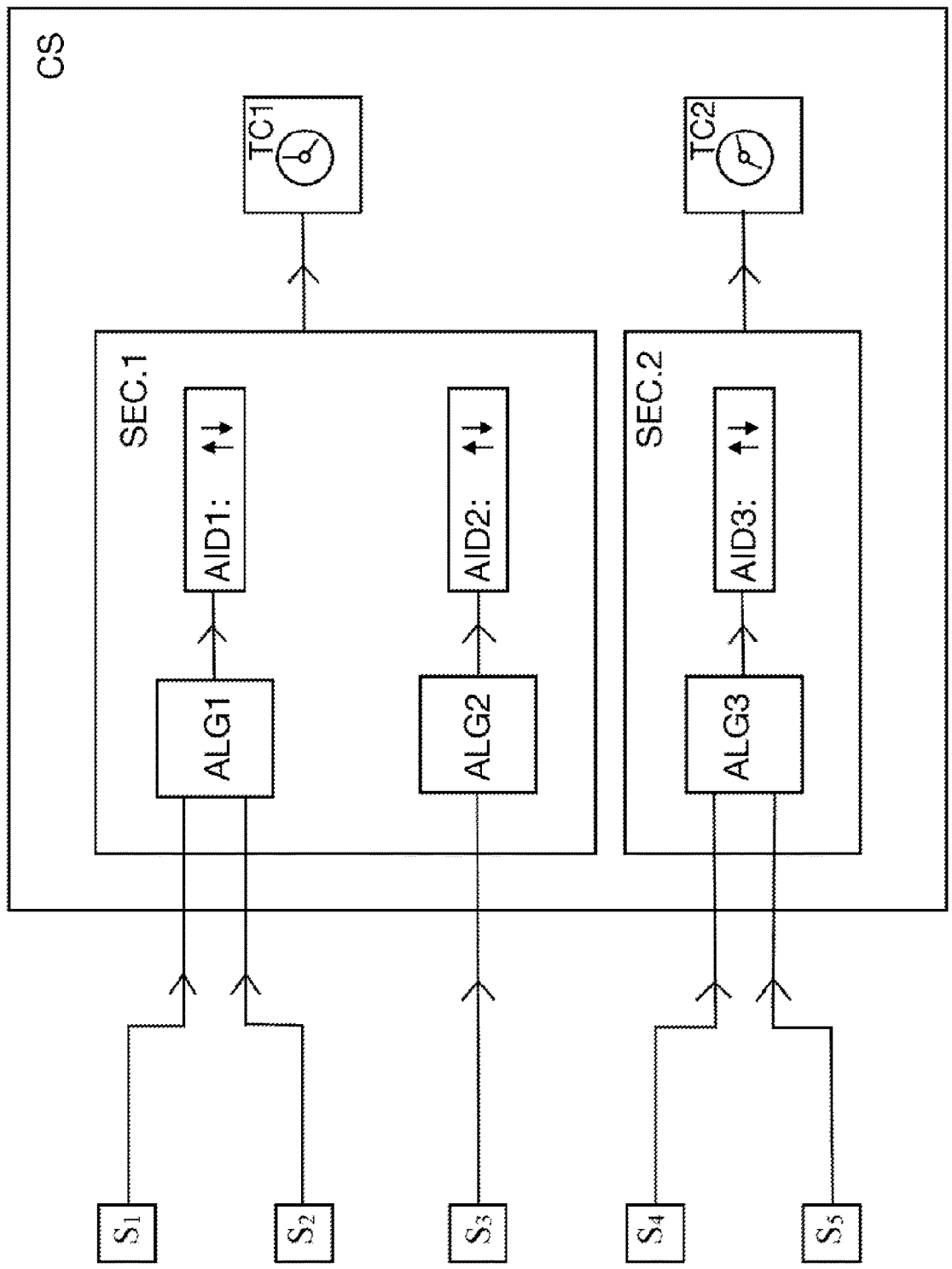
FIG. 2 schematically illustrates details of the operation of the control system of a wind turbine.

FIG. 2 illustrates schematically in more detail the concept of sectors of alarm IDs as used in the present invention.

FIG. 2 shows the control system CS of a wind turbine. The control system CS receives operational information relating to the operation of the wind turbine from the sensors $S_1$, $S_2$, $S_3$, $S_4$ and $S_5$.

The control system CS has embedded therein three algorithms ALG 1, ALG 2 and ALG3. These algorithms are configured for determining whether or not parameters sensed by the sensors $S_1$, $S_2$, $S_3$, $S_4$ and $S_5$ represent a critical event which implies the necessity to shut down the wind turbine.

Accordingly, sensed parameters originating from sensors $S_1$ and $S_2$ collectively are used in algorithm ALG 1 in order to determine whether or not the parameters provided by sensors sensors $S_1$ and $S_2$ collectively represent such a critical event.

In case the parameters $S_1$ and $S_2$ collectively represents a critical event, the algorithm ALG 1 will provide an alarm value in the form of the setting of an alarm ID1 (as represented by the arrow ↑). The setting of the alarm ID 1 will cause the control system to shut down the wind turbine.

When the sensors $S_1$ and $S_2$ sometime later collectively provides information in respect of which the algorithm ALG 1 determines that the critical event is no longer present, the algorithm ALG 1 will resent the alarm ID 1 (as represented by the arrow ↓).

It is seen in FIG. 2 that the sensors $S_4$ and $S_5$ collective are used as input for an algorithm ALG 3, which will be able to set and reset an alarm ID 3 (as represented by the arrows ↑ and ↓).

FIG. 2 also shows that the sensor $S_5$ is used alone as input to the algorithm ALG 2 which is configured to determine whether a critical event is being present. In case so, the alarm ID 2 is being set (as represented by the arrow ↑). Likewise, when the algorithm ALG 2, based on information from sensor $S_3$, determines that the critical event is no longer present, the algorithm ALG 2 will reset the alarm ID 2 (as represented by the arrows ↓).

FIG. 2 moreover illustrates that the various alarm IDs belong to various sectors. Accordingly, alarm ID 1 and alarm ID2 belong to one sector (SEC 1), whereas the alarm ID 3 belongs to another sector (SEC 2).

SEC 1 may relate to the operational state of the grid into which power produced by the wind turbine is to be delivered, whereas SEC 2 may relate to the mechanical integrity of the turbine.

Finally, FIG. 2 illustrates that the sectors SEC 1 and SEC2 each is coupled to a time counter, viz. TC1 and TC2, respectively.

TC1 is configured for counting the amount of time, optionally also the specific periods of time, at which no alarms in SEC 1 is being set.

Likewise, TC2 is configured for counting the amount of time, optionally also the specific periods of time, at which no alarms in SEC 2 is being set.

The information relating to setting and resetting of various alarms and the associated time stamps, and the time counters TC1 and TC2 is being provided to the monitoring system MS shown in FIG. 1.

EXAMPLE

The following example illustrates the method of the present invention.

In the example the operation of a wind turbine being controlled by a control system. The control system is having a structure like the one illustrated in FIG. 2.

The sector SEC 1 in FIG. 2 is associated with the operational state of the grid into which power produced by the wind turbine is to be delivered.

From the time counter TC 1 the following information has been registered by the monitoring system MS:

| Time stamp | Accumulated time in respect of which no alarm IDs have been registered by the monitoring system MS (seconds) |
|---|---|
| 2018 Aug. 5 10:00 | 31,536,975 |
| 2018 Aug. 5 10:10 | 31,537,575 |
| 2018 Aug. 5 10:20 | 31,538,175 |
| 2018 Aug. 5 10:30 | 31,538,211 |
| 2018 Aug. 5 10:40 | 31,538,211 |
| 2018 Aug. 5 10:50 | 31,538,211 |
| 2018 Aug. 5 11:00 | 31,538,211 |
| 2018 Aug. 5 11:10 | 31,538,211 |
| 2018 Aug. 5 11:20 | 31,538,459 |
| 2018 Aug. 5 11:30 | 31,539,059 |

It is seen that in the period of time 10:30 to 11:10 it has been registered by the control system CS that the time counter TC1, counting time in respect of which no alarms IDs belonging to SEC 1 has been set, has stopped counting. Accordingly, this implies that one of the alarms associated with alarm ID1 or alarm ID2 (belonging to SEC 1) must have been set in the period from 10:30 to 11:10.

In the method of the first aspect of the present invention it is investigated whether or not the setting of one of the alarm ID 1 or alarm ID 2 have been registered by the monitoring system MS, and in case no such registration has appeared, the sector SEC 1, relating to the operational state of the grid into which power produced by the wind turbine is delivered, is registered as not operating correctly.

This information is being logged by the data log DL as illustrated in FIG. 1 and will appear in the operational report retrievable from the data log DL.

Hereby a more accurate picture of the operational state of the wind turbine is attained.

It should be understood that all features and achievements discussed above and in the appended claims in relation to one aspect of the present invention and embodiments thereof apply equally well to the other aspects of the present invention and embodiments thereof.

LIST OF REFERENCE NUMERALS

WT Wind turbine
CS Control system
MS Monitoring system
DL Data log
OR Operational report originating from Data log
AI Alarm information
OI Operational information
$S_1$ Sensor No. 1 monitoring the operation of the wind turbine
$S_2$ Sensor No. 2 monitoring the operation of the wind turbine
$S_3$ Sensor No. 3 monitoring the operation of the wind turbine
$S_4$ Sensor No. 4 monitoring the operation of the wind turbine
$S_5$ Sensor No. 5 monitoring the operation of the wind turbine
$S_N$ Sensor No. N monitoring the operation of the wind turbine
$A_{ID\ 1}$ Information relating to alarms from Alarm ID 1
$A_{ID\ 2}$ Information relating to alarms from Alarm ID 2
$A_{ID\ 3}$ Information relating to alarms from Alarm ID 3
$A_{ID\ M}$ Information relating to alarms from Alarm ID M
ST(1) Time stamp in respect of setting of alarm ID 1
ST(2) Time stamp in respect of setting of alarm ID 2
ST(3) Time stamp in respect of setting of alarm ID 3
ST(M) Time stamp in respect of setting of alarm ID M
RST(1) Time stamp in respect of resetting of alarm ID 1
RST(2) Time stamp in respect of resetting of alarm ID 2
RST(3) Time stamp in respect of resetting of alarm ID 3
RST(M) Time stamp in respect of resetting of alarm ID M
ALG 1 Algorithm 1 for detecting a critical event
ALG 2 Algorithm 2 for detecting a critical event
ALG 3 Algorithm 3 for detecting a critical event
SEC 1 Sector 1 of alarm IDs
SEC 2 Sector 2 of alarm IDs
TC1 Time counter relating to Sector 1
TC2 Time counter relating to Sector 2
↑ Alarm info indicating a setting of a specific alarm ID
↓ Alarm info indicating a resetting of a specific alarm ID

The invention claimed is:

1. A process comprising the steps of:
generating one or more specific operating parameter values of a wind turbine during operation thereof with one or more sensors ($S_1$, $S_2$, $S_3$, . . . $S_N$);

transmitting said one or more specific operating parameter values to a control system (CS);

registering a critical event in said control system (CS when one or more specific operating parameter values corresponds to one or more predetermined criteria for shutting down the wind turbine;

setting a specific alarm by said control system (CS) a point in time at which a critical event is registered, wherein said specific alarm is reset by said CS at a point in time at which the registration of the presence of said critical event ceases;

wherein each specific alarm is associated with a corresponding alarm ID, wherein said alarms IDs are grouped into different sectors (SEC 1, SEC 2), each sector corresponding to a specific part of the wind turbine or its installation or operation;

wherein information from said control system (CS) relating to settings and resetting of one or more alarms corresponding to an individual alarm ID is transmitted to a monitoring system configured to log and store such information;

said process further comprising the steps of:
i) registering a time stamp (ST(1), ST(2), ST(3), . . . ST(M)) via a monitoring system (MS) in response to each setting of an alarm ID and registering a time stamp (RST(1), RST(2), . . . RST(3), RST(M)) in response to each resetting of said alarm ID;
ii) counting the amount of time in the control system (CS) during which an alarm ID corresponding to a specific sector is not set, and transferring information relating to such counting to said monitoring system (MS);
iii) registering that the wind turbine is not operating properly in a sector over a particular period of time when the monitoring system detects that counting of an alarm ID in step ii) has stopped.

2. A process according to claim 1, wherein the number of sensors ($S_1, S_2, S_3, \ldots S_N$) in said array of sensors and/or the number of alarm IDs of said wind turbine independently is at least 5.

3. A process according to claim 1, wherein one or more of said one or more sensors ($S_1, S_2, S_3, \ldots S_N$) relate to sensors for sensing:

problems with the mechanics; such as undesirably low level of gear oil, undesirably high bearing temperature, stuck pitch actuator, undesirably high yaw misalignment; and/or problems with the grid, such as undesirably low grid frequency, undesirably high grid voltage, phase asymmetry; and/or problems with the environment, such as undesirably high wind speed, undesirably low ambient temperature, undesirably low wind speed; and/or external commands, such as remote stop instructions; and/or normal operation, such as untwisting cables, performing self-test, heating component; and/or wind turbine has been stopped by power trader; and/or wind turbine has been stopped by utility authority or by grid authority.

4. A process according to claim 1, wherein said one or more sectors (SEC 1, SEC 2) belongs to one or more of the following: data relating to the operation of the turbine; data relating to the environment of the wind turbine; data relating to the grid to which the wind turbine supplies power; data relating to "remotely stopped"; data relating to "stopped for service"; data relating to "stopped by trader".

5. A process according to claim 1, wherein the time counting performed in step ii) by said control system (CS) comprises registering at time stamps, separated by a predetermined period of time, a counting of the accumulated time at which no alarm IDs belonging to that specific sector is set.

6. A process according to claim 5, wherein the predetermined period of time is from 0.1 s-600 min.

7. A process according to claim 1, wherein said process is performed automatically.

8. A process according to claim 1, wherein said process is performed continuously or regularly in respect of successive time spans.

9. A process according to claim 1, wherein said process further comprises keeping a data log (DL), which logs a data set originating from said monitoring system (MS) and relating to one or more of the following entries: alarm IDs in respect of which an alarm has been set and/or reset, including the corresponding time stamp; information relating to the amount of time at which no alarm IDs belonging to that specific sector is set in respect of a specific sector, as determined in step ii); and the registration as performed in step iii).

10. A computer program product, which when loaded and/or operating on a computer, is configured to perform a process according to claim 1.

11. A SCADA system (Supervisory Control And Data Acquisition System) comprising a computer program product as defined in claim 10.

12. A process according to claim 2, wherein the number of sensors (S1, S2, S3, . . . SN) in said array of sensors and/or the number of alarm IDs of said wind turbine independently is selected from the range of 5-2000.

* * * * *